United States Patent
Jougit et al.

(10) Patent No.: US 9,301,339 B2
(45) Date of Patent: *Mar. 29, 2016

(54) METHOD AND SYSTEM FOR MULTIPLE HCI TRANSPORT FOR BLUETOOTH HOST CONTROLLERS

(75) Inventors: Mickael Jougit, Mougins le haut (FR); Roger Lendenmann, Mouans-Sartoux (FR); Rafael Sotomayer, Oceanside, CA (US)

(73) Assignee: Broadcom Corporation, Irvine, CA (US)

( * ) Notice: Subject to any disclaimer, the term of this patent is extended or adjusted under 35 U.S.C. 154(b) by 2762 days.

This patent is subject to a terminal disclaimer.

(21) Appl. No.: 11/680,872

(22) Filed: Mar. 1, 2007

(65) Prior Publication Data
US 2008/0212648 A1 Sep. 4, 2008

(51) Int. Cl.
*H04B 7/00* (2006.01)
*H04W 92/00* (2009.01)
*H04W 84/18* (2009.01)

(52) U.S. Cl.
CPC .............. *H04W 92/00* (2013.01); *H04W 84/18* (2013.01)

(58) Field of Classification Search
CPC ....... H04B 1/005; H04W 92/00; H04W 84/18
USPC ........ 455/41.1, 41.2, 41.3, 556.1, 574, 127.5, 455/343.1
See application file for complete search history.

(56) References Cited

U.S. PATENT DOCUMENTS

| 6,771,933 B1 * | 8/2004 | Eng et al. ...................... 455/41.2 |
| 7,526,253 B2 * | 4/2009 | Fujioka ......................... 455/41.3 |

* cited by examiner

*Primary Examiner* — Ping Hsieh
(74) *Attorney, Agent, or Firm* — McDermott Will & Emery LLP (57) ABSTRACT

Aspects of a method and system for multiple HCI transport for Bluetooth® Host controllers may include communicating between a plurality of Bluetooth® hosts and a single Bluetooth® host controller by using one or more Bluetooth® host controller interfaces. Control of the Bluetooth® host controller interfaces may be assigned to one or more of the Bluetooth® hosts. Control of the Bluetooth® host controller interfaces may be switched among different Bluetooth® hosts using various protocol commands may be used to communicate between Bluetooth® hosts to control switching. Communications between Bluetooth® hosts may occur over interfaces different from the Bluetooth® host controller interfaces. Switching may occur without resetting the Bluetooth® hosts and Bluetooth® host controller.

21 Claims, 6 Drawing Sheets

METHOD AND SYSTEM FOR MULTIPLE HCI TRANSPORT FOR BLUETOOTH HOST CONTROLLERS

CROSS-REFERENCE TO RELATED APPLICATIONS/INCORPORATION BY REFERENCE

This application makes reference to:
U.S. application Ser. No. 11/680,911 filed on Mar. 1, 2007.

The above referenced application is hereby incorporated herein by reference in its entirety.

FIELD OF THE INVENTION

Certain embodiments of the invention relate to wireless communication systems. More specifically, certain embodiments of the invention relate to a method and system for multiple HCI transport for Bluetooth® Host controllers.

BACKGROUND OF THE INVENTION

Bluetooth® wireless technology offers personal connectivity and provides freedom from wired connections. Bluetooth® is a specification for a small form-factor, low-cost radio solution providing links between mobile computers, mobile phones and other portable, handheld devices.

Bluetooth® wireless technology is an international, open standard for allowing intelligent devices to communicate with each other through wireless, short-range radio links. This technology allows Bluetooth® compliant devices such as computers, cell phones, keyboards and/or headphones to establish connections, without wires, cables or any direct action from a user. Bluetooth® is currently incorporated into numerous commercial products including laptops, Personal Digital Assistants (PDAs), cell phones, and printers, with more products being released every day.

Modern portable devices increasingly provide converged functionality of many devices that used to be separate entities. For example, it is now common to find PDA, cell phone and portable music player converged into a single device. Such multi-modal devices often comprise a variety of functional blocks to fulfill various tasks and several functional blocks and/or chipsets may access Bluetooth® functionality.

A Bluetooth® system normally comprises a Bluetooth® host that may be part of a functional block, and a Bluetooth® host controller. The Bluetooth® host may, for example, be a GSM (Global System for Mobile Communications) chipset or functional block. The Bluetooth® host provides a high level interface between a Bluetooth® command set and a core application furnished by the Bluetooth® host. A Bluetooth® host may be coupled to a Bluetooth® host controller via a host controller interface (HCI). The Bluetooth® host controller comprises the baseband and RF portion of the Bluetooth® system, that is, the actual radio part that may be connected to the Bluetooth® antenna. If, for example, the Bluetooth® host is a GSM block and there is also a multimedia decoder block that may need to stream music to a pair of Bluetooth® headphones, the multimedia decoder will send the audio data to the Bluetooth® Host in the GSM block to be forwarded to the Bluetooth® Host controller. The disadvantage of such a structure is that the functional block comprising the Bluetooth® host is always required to be active whenever Bluetooth® functionality is required, even if its core functionality may not be required. In this example, when the GSM phone functionality is switched off but the user is playing music over Bluetooth® headphones, the GSM block may need to remain active. Such a configuration is, however, power inefficient.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for multiple HCI transport for Bluetooth® Host controllers, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for multiple HCI transport for Bluetooth® Host controllers. Aspects of a method and system may comprise communicating between a plurality of Bluetooth® hosts and a single Bluetooth® host controller by using one or more Bluetooth® host controller interfaces. Control of the Bluetooth® host controller interfaces may be assigned to one or more of the Bluetooth® hosts. Control of the Bluetooth® host controller interfaces may be switched among different Bluetooth® hosts using various protocol commands. Communications between Bluetooth® hosts may occur over interfaces different from the Bluetooth® host controller interfaces. Switching may occur without resetting the Bluetooth® hosts and Bluetooth® host controller.

Figure 1A:
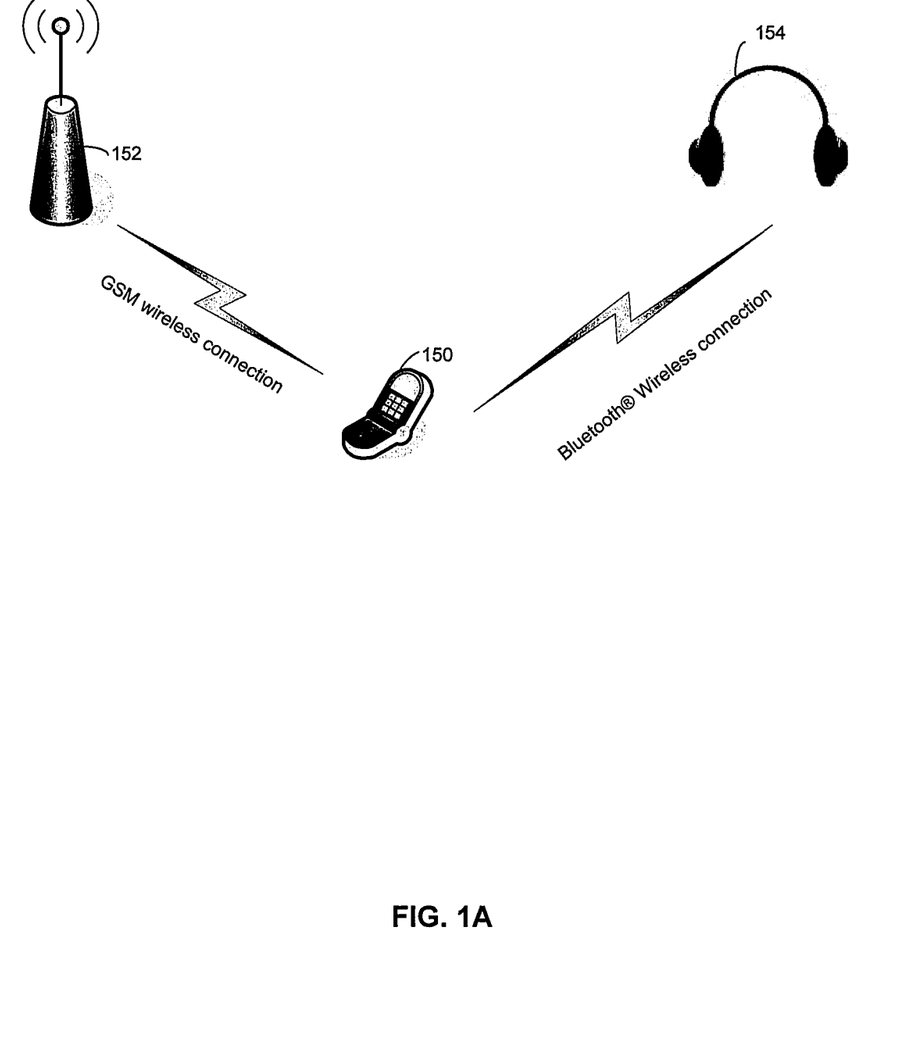
FIG. 1A is a diagram illustrating an exemplary communications system utilizing Bluetooth®, in connection with an embodiment of the invention.

FIG. 1A is a diagram illustrating an exemplary communications system utilizing Bluetooth®, in connection with an embodiment of the invention. Referring to FIG. 1A, there is shown a GSM handset 150, a GSM base station 152 and Bluetooth® headphones 154. There is also shown a GSM wireless connection and a Bluetooth® wireless connection.

Many modern portable devices may comprise Bluetooth® functionality. For example, Global System for Mobile Communications (GSM) handsets may comprise Bluetooth® blocks to connect to a large variety of peripheral devices. In FIG. 1A, an exemplary GSM headset 150 may be utilizing a Bluetooth® wireless connection to connect to the Bluetooth® headphones 154.

In addition to its core telephone functionality, the GSM handset 150 may comprise further functional blocks and/or chipsets to provide additional functionality. For example, the GSM handset 150 may comprise an audio decoder block that may efficiently decode a number of music formats. In order for the user of the GSM handset 150 to listen to audio decoded by the audio block on the Bluetooth® headphones 154, the GSM handset 150 may forward audio data from the audio block over its Bluetooth® stack to the Bluetooth® headphones 154.

Figure 1B:
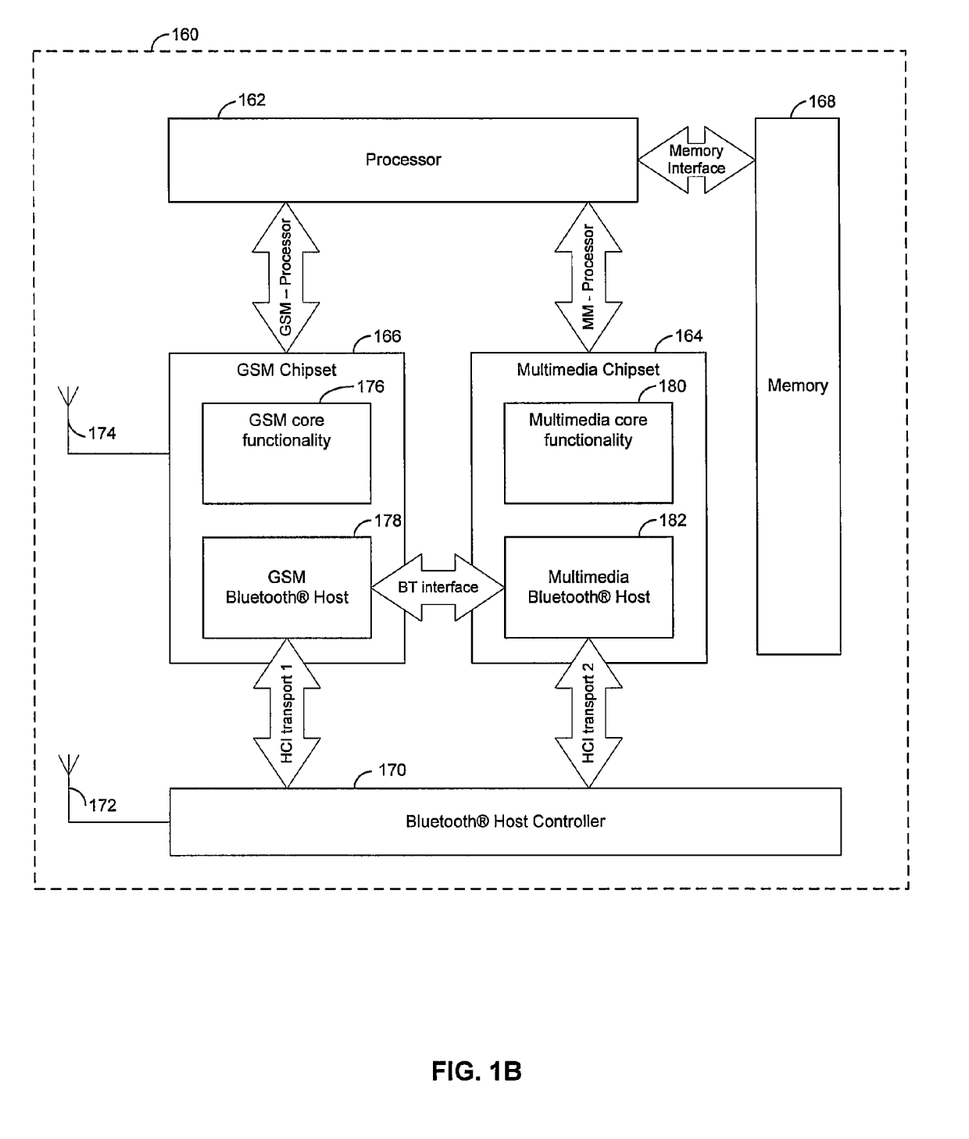
FIG. 1B is a block diagram illustrating an exemplary GSM handset with multiple Bluetooth® hosts, in accordance with an embodiment of the invention.

FIG. 1B is a block diagram illustrating an exemplary GSM handset with multiple Bluetooth® hosts, in accordance with an embodiment of the invention. Referring to FIG. 1B, there is shown a GSM handset 160, comprising a processor 162, system memory 168, a GSM block 166, a multimedia block 164, a Bluetooth® host controller 170, a GSM antenna 174 and a Bluetooth® antenna 172. The GSM block 166 may comprise a GSM core functionality block 176 and a GSM Bluetooth® Host 178. The multimedia block 164 may comprise a multimedia core functionality block 180 and a multimedia Bluetooth® host 182. There is also shown a GSM-processor interface, a multimedia (MM)-processor interface, a memory interface, a Bluetooth® (BT) interface, and host controller interface (HCI) transport 1 and HCI transport 2. The processor 162 may be a main processor or a baseband processor, for example.

The GSM handset 160 may be controlled by the processor 162, utilizing system memory 168 via the memory interface. The processor 162 may control the high-level functionality of the GSM handset 160, for example, the user interface and access to the GSM block 166 and the multimedia block 164. Access to the GSM block 166 and the multimedia block 164 may occur via the GSM-processor interface and the MM-processor interface, respectively. In one embodiment of the invention, the GSM block 166, the system memory 168, the multimedia block 164, processor 162, Bluetooth® host controller 170, the GSM antenna 174 and the Bluetooth® antenna 172 may be functional blocks of a single chipset. In another embodiment of the invention, the functional blocks may each be a chip or some functional blocks may be combined into a chip.

The GSM block 166 may provide the core mobile telephone functionality of the GSM handset 160 in the GSM core functionality block 176. The GSM block 166 may also be communicatively coupled to the GSM antenna 174. In addition, the GSM block 166 may comprise a GSM Bluetooth® host 178 that may be used, for example, to connect to peripheral devices like headsets. The multimedia block 164 may provide, for example, audio and video decoding for the GSM handset 160. The multimedia block 164 may comprise a multimedia Bluetooth® host 182 that may communicate directly with the Bluetooth® host controller 170 via the HCI transport 2 and the GSM Bluetooth® host 178 via the Bluetooth® interface. The GSM Bluetooth® host 178 in the GSM block 166 may also communicate directly with the Bluetooth® host controller 170 via HCI transport 1. The Bluetooth® host controller 170 may comprise the radio portion of the Bluetooth® radio and hence may be communicatively coupled to the Bluetooth® antenna 172.

While FIG. 1B depicts an exemplary GSM handset 160, it may be envisaged that the wireless system in FIG. 1B may comprise any number of functional block combinations with multiple Bluetooth® hosts. For example, an IEEE 802.11 WLAN block, a CDMA block or a WIMAX block may replace the GSM block 166 and a video block, an FM radio block, a keyboard controller block or a photo camera block may replace the multimedia block 164.

Figure 1C:
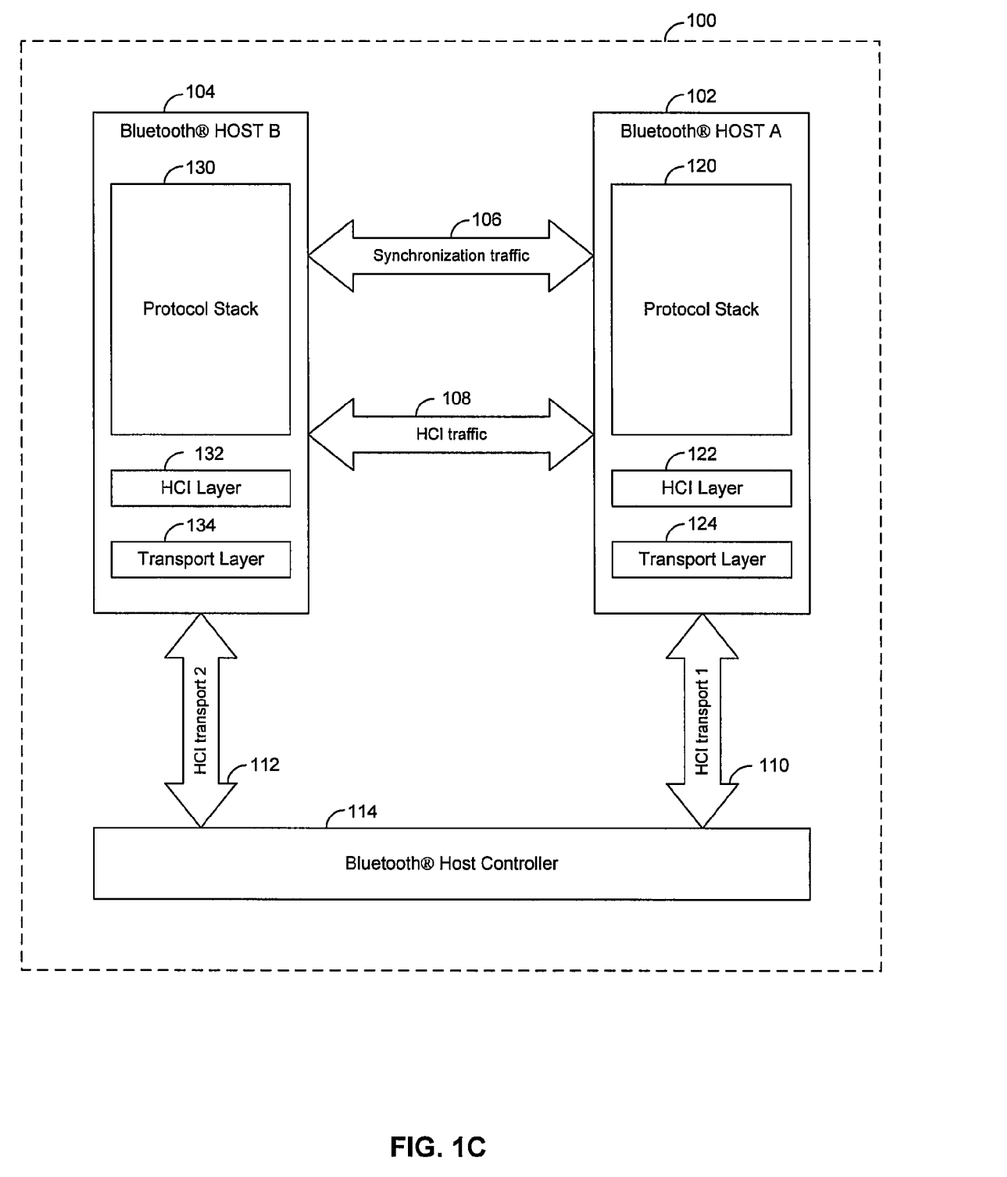
FIG. 1C is a block diagram illustrating an exemplary Bluetooth® system, in accordance with an embodiment of the invention.

FIG. 1C is a block diagram illustrating an exemplary Bluetooth® system, in accordance with an embodiment of the invention. Referring to FIG. 1C, there is shown a Bluetooth® system 100 comprising a Bluetooth® host A 102, a Bluetooth® host B 104, a synchronization traffic connection 106, an HCI traffic connection 108, an HCI transport 1 110, an HCI transport 2 112 and a Bluetooth® host controller 114. A Bluetooth® host A 102 may comprise a protocol stack 120, an HCI Layer 122 and a transport layer 124. A Bluetooth® host B may comprise a protocol stack 130, an HCI Layer 132 and a transport layer 134.

In FIG. 1C, a Bluetooth® system comprising a Bluetooth® host controller 114 and two Bluetooth® hosts, Bluetooth® host A 102 and Bluetooth® host B 104 is shown. As specified by the Bluetooth® Special Interest Group (SIG), each Bluetooth® host may be connected to a Bluetooth® host controller. However, as illustrated in FIG. 1C, a plurality of Bluetooth® hosts, for example the Bluetooth® host A 102 and the Bluetooth® host B 104, may be connected to a Bluetooth® host controller 114. The Bluetooth® host A 102 may be connected to the Bluetooth® host controller 114 by HCI transport 1 110, which may be, but is not limited to, a Universal Asynchronous Receiver/Transmitter (UART) interface, a Universal Serial Bus (USB) interface or a Serial Peripheral Interface (SPI). Equivalently, the Bluetooth® host B 104 may be connected to the Bluetooth® host controller 114 by HCI transport 2 112, which may be any feasible communications interface.

Although the Bluetooth® host controller 114 may be connected to a plurality of Bluetooth® hosts, the Bluetooth® host controller 114 may handle one HCI transport at a time. Therefore, the Bluetooth® hosts may negotiate among themselves which Bluetooth® host may communicate with the Bluetooth® host controller 114 at any given time. For this purpose, the plurality of Bluetooth® hosts may communicate among themselves, for example, through shared memory or other suitable methods. In the embodiment of the invention shown in FIG. 1C, the Bluetooth® host A 102 may communicate with the Bluetooth® host B 104 via a synchronization traffic connection 106 and an HCI traffic connection 108. The synchronization traffic connection 106 may be used for high-level synchronization between the Bluetooth® host A 102 and the Bluetooth® host B 104, and the HCI traffic connection 108 may be used to transfer HCI data.

Since the Bluetooth® host A 102 and the Bluetooth® host B 104 may communicate independently with the Bluetooth® host controller 114, both the Bluetooth® host entities may possess the capability to communicate with the Bluetooth® host controller 114. The protocol stacks 120 and 130, the HCI layer 122 and 132, and the transport layer 124 and 134 may enable the Bluetooth® host A 102 and the Bluetooth® host B 104, respectively, to communicate with the Bluetooth® host controller 114. In one embodiment of the invention, the Bluetooth® host 102, the Bluetooth® host 104, and the Bluetooth® host controller 114 may be functional blocks of a single chipset. In another implementation, the functional blocks may each be a chip or some functional blocks may be combined into a chip.

Figure 2:
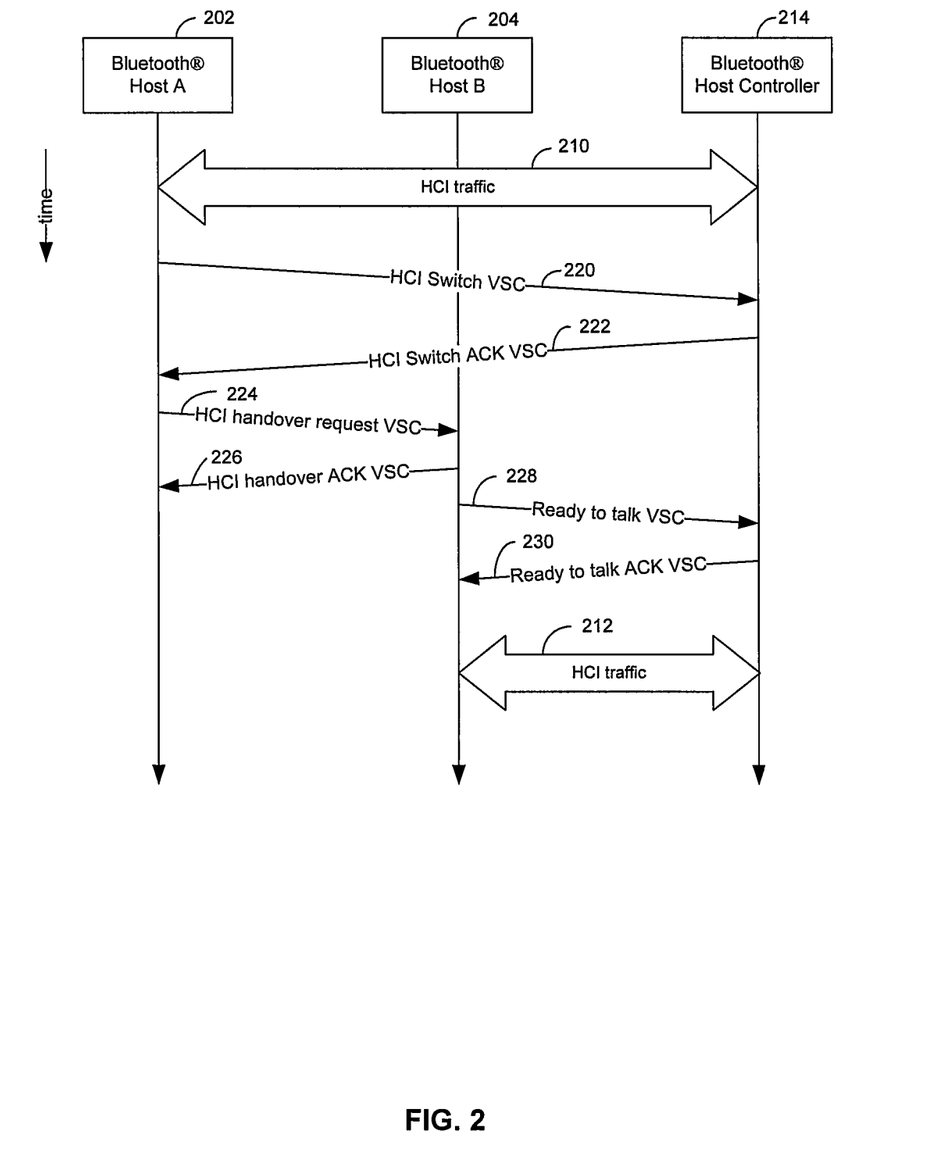
FIG. 2 is a flow diagram illustrating an exemplary HCI switching protocol, in accordance with an embodiment of the invention.

FIG. 2 is a flow diagram illustrating an exemplary HCI switching protocol, in accordance with an embodiment of the invention. Referring to FIG. 2, there is shown Bluetooth® host A 202, Bluetooth® host B 204 and Bluetooth® host controller 214 and protocol steps 210, 212, 220, 222, 224, 226, 228 and 230.

The communicating entities, Bluetooth® host A 202, Bluetooth® host B 204 and Bluetooth® host controller 214 are horizontally aligned in FIG. 2. Time may be increasing in the direction indicated by the arrow labeled 'time'. Protocol communications may take place between the entities that may be connected by the protocol steps and, if applicable, may be directional as indicated by the protocol step arrow. The Bluetooth® host A 202, the Bluetooth® host B 204, and the Bluetooth® host controller 214 may correspond to Bluetooth® host A 102, Bluetooth® host B 104 and Bluetooth® host controller 114, respectively, as shown in FIG. 1C.

In protocol step 210, Bluetooth® host A 202 may be connected to Bluetooth® host controller 214. The Bluetooth® host B 204, although physically connected to the Bluetooth® host controller via HCI transport 2 112 shown in FIG. 1C, may have disabled HCI transport 2. It may be desirable for the Bluetooth® host A 202 to switch HCI control over to Bluetooth® host B 204. This may occur, for example, in instances where the Bluetooth® Host A 202 may go to sleep but some Bluetooth® functionality for the Bluetooth® host B 204 may still be required. In step 220, the Bluetooth® host A 202 may send a switch command such as a HCI switch Vendor-Specific Command (VSC) to the Bluetooth® host controller 214. The Bluetooth® host controller 214 may then acknowledge receipt of the HCI switch VSC in step 220 by sending an HCI switch Acknowledge (ACK) VSC to the Bluetooth® host A 202 in step 222. After sending the HCI Switch ACK VSC in step 222, the Bluetooth® host controller 214 may disable the HCI transport 1 110 as shown in FIG. 1C, to terminate any communications with Bluetooth® host A 202 and enable the HCI transport 2 112. After receiving the HCI switch ACK VSC in step 222, the Bluetooth® Host A 202 may send an HCI handover request in step 224 to Bluetooth® host B 204. This may be achieved, for example, via the HCI traffic interface 108, shown in FIG. 1C. The Bluetooth® host B 204 may send an HCI handover ACK in step 226, confirming that it may initiate communications with the Bluetooth® host controller 214. The Bluetooth® Host B 204 may then enable its side of the HCI transport 2 112, shown in FIG. 1C, and send a Ready to talk VSC in step 228 to the Bluetooth® host controller 214. The Bluetooth® host controller 214 may respond with a Ready to talk ACK VSC in step 230. The HCI handover from Bluetooth® host A 202 to Bluetooth® host B 204 may be complete and normal HCI communications between the Bluetooth® host B 204 and Bluetooth® host controller 214 may commence in step 212, HCI traffic.

Figure 3:
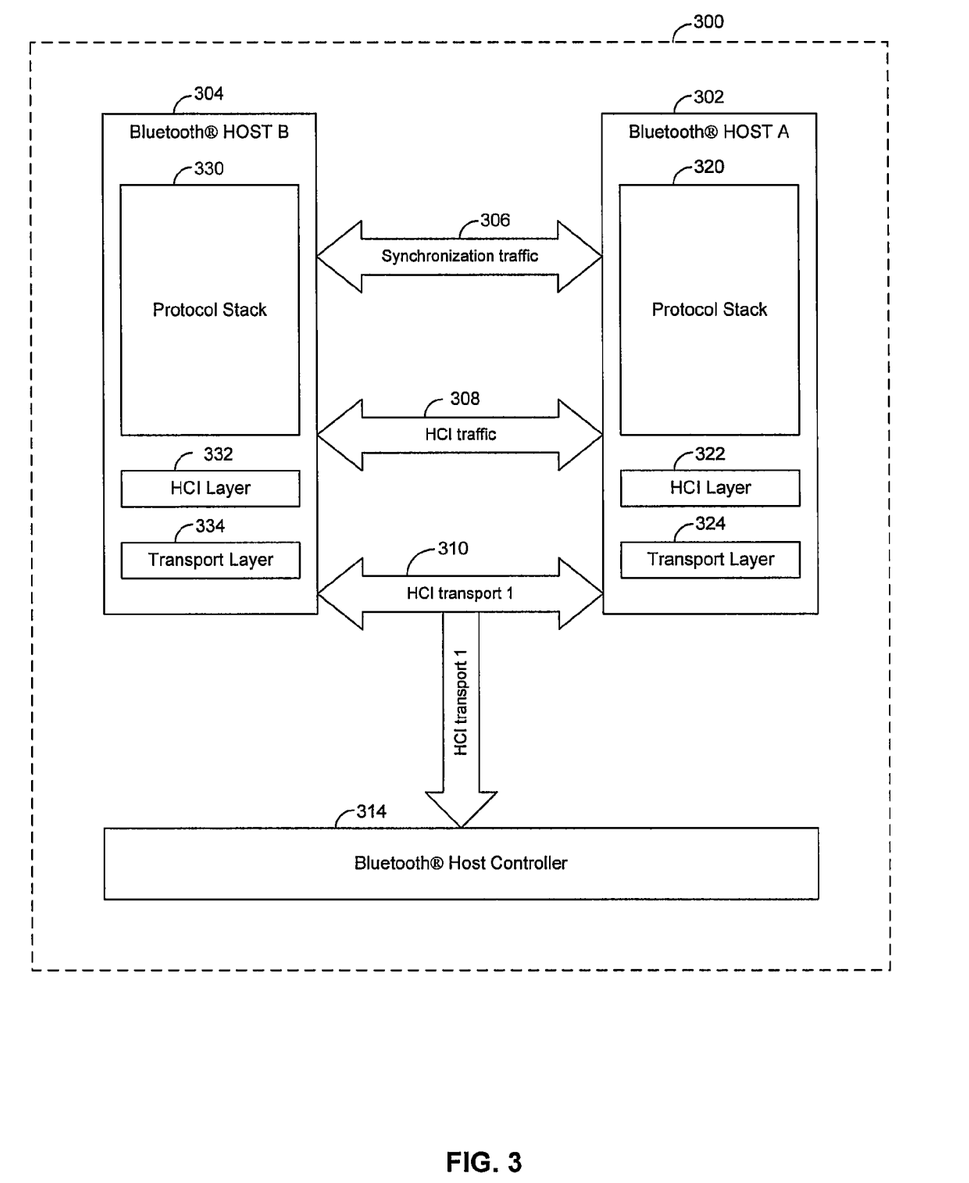
FIG. 3 is a block diagram illustrating an exemplary Bluetooth® system with a single HCI transport bus, in accordance with an embodiment of the invention.

FIG. 3 is a block diagram illustrating an exemplary Bluetooth® system with a single HCI transport bus, in accordance with an embodiment of the invention. Referring to FIG. 3, there is shown a Bluetooth® system 300 comprising a Bluetooth® host A 302, a Bluetooth® host B 304, a synchronization traffic connection 306, an HCI traffic connection 308, an HCI transport 1 310, and a Bluetooth® host controller 314. A Bluetooth® host A may comprise a protocol stack 320, an HCI Layer 322 and a transport layer 324. A Bluetooth® host B may comprise a protocol stack 330, an HCI layer 332 and a transport layer 334.

In an embodiment of the invention, with reference to FIG. 3, a plurality of Bluetooth® hosts may be communicatively coupled to a single HCI transport bus. An exemplary configuration is shown in FIG. 3, in which the Bluetooth® host A 302 and the Bluetooth® host B 304 may be coupled to HCI transport 1 310. This configuration may provide an alternative method of coupling a plurality of Bluetooth® hosts to Bluetooth® host controller 314. An advantage may be that only a single HCI interface 1 310 may be required for the Bluetooth® host controller 314. At any given time, either the Bluetooth® host A 302 or the Bluetooth® host B 304 may be communicating with the Bluetooth® host controller 314. The Bluetooth® hosts that may not be communicating with the Bluetooth® host controller 314 may disable their access onto the HCI transport 1 310 interface.

The Bluetooth® host A 302 and Bluetooth® host B 304, the Bluetooth® host controller 314, the synchronization traffic connection 306, and the HCI traffic connection 308 may be considered functionally similar to the blocks 102, 104, 114, 106 and 108, respectively, shown in FIG. 1C. In one embodiment of the invention, the Bluetooth® host 302, the Bluetooth® host 304, and the Bluetooth® host controller 314 may be functional blocks of a single chipset. In another implementation, the functional blocks may each be a chip or some functional blocks may be combined into a chip.

Figure 4:
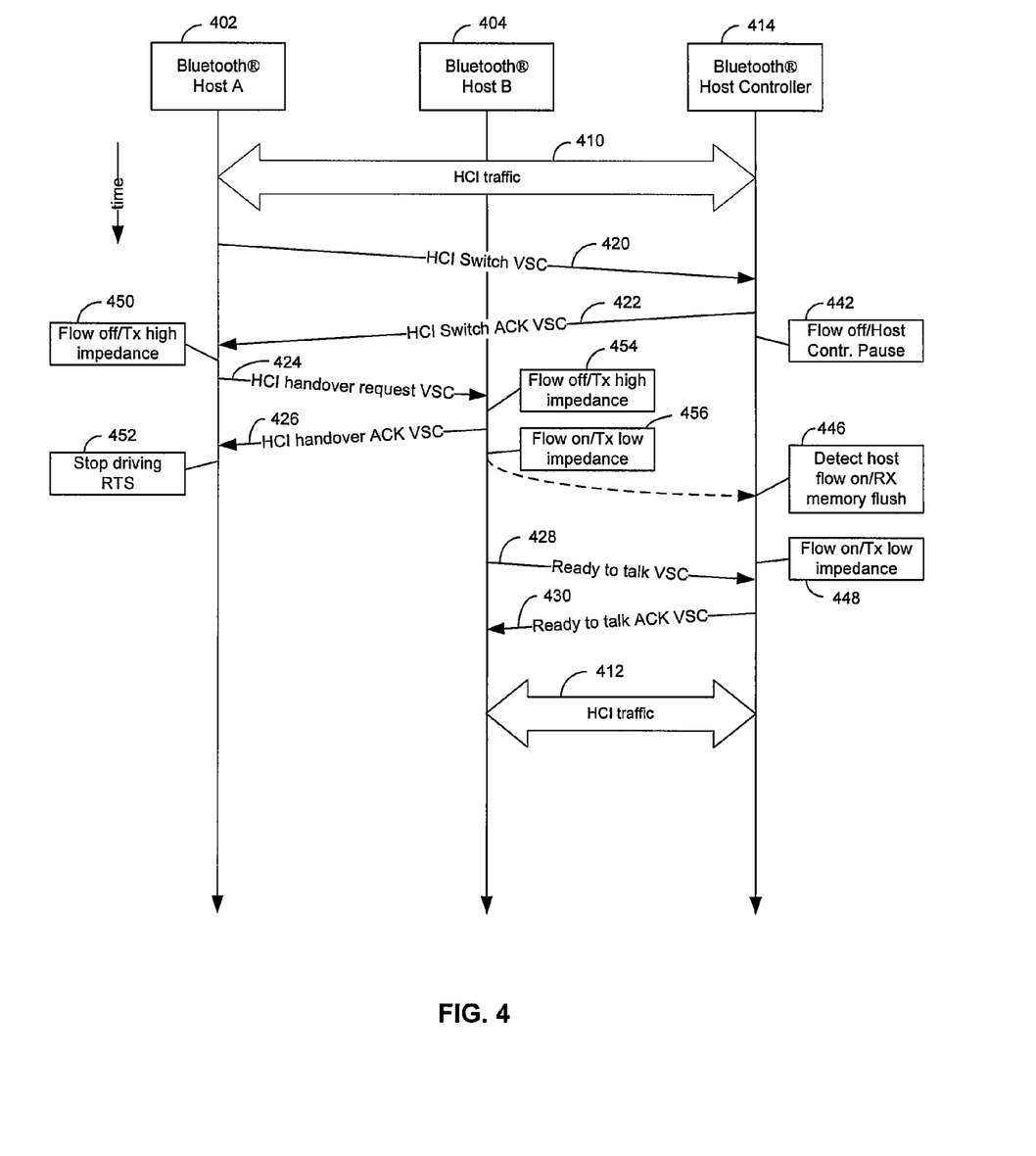
FIG. 4 is a flow diagram illustrating an exemplary HCI switching protocol with a single HCI transport bus, in accordance with an embodiment of the invention.

FIG. 4 is a flow diagram illustrating an exemplary HCI switching protocol with a single HCI transport bus, in accordance with an embodiment of the invention. Referring to FIG. 4, there is shown a Bluetooth® host A 402 and Bluetooth® host B 404 and Bluetooth® host controller 414 and protocol steps 410, 412, 420, 422, 424, 426, 428 and 430. There is also shown events 442, 446, 448, 450, 452, 454 and 456.

The communicating entities, Bluetooth® host A 402, Bluetooth® host B 404 and Bluetooth® host controller 414 may be horizontally aligned in FIG. 4. Time may be increasing in the direction indicated by the arrow labeled 'time'. Protocol communication may take place between the communicating entities that may be connected by the protocol steps and, if applicable, may be directional as indicated by the protocol step arrow. The Bluetooth® host A 402, the Bluetooth® host B 404 and the Bluetooth® host controller 414 may correspond to the Bluetooth® host A 302, the Bluetooth® host B 304 and the Bluetooth® host controller 314, respectively, as shown in FIG. 3.

Since a plurality of Bluetooth® hosts may be communicatively coupled to a single HCI transport bus 310, as shown in FIG. 3, the Bluetooth® host A 402 and the Bluetooth® host B 404 may be required to enable and disable their respective access to the HCI transport bus.

In protocol step 410, the Bluetooth® host A 402 may be coupled to the Bluetooth® host controller 414. A plurality of the Bluetooth® hosts may be physically coupled to HCI transport 1 310 interface, as shown in FIG. 3, but a single Bluetooth® host may be active on the HCI transport 1 310 interface at a given time. It may be desirable for the Bluetooth® host A 402 to switch HCI control over to the Bluetooth® host B 404. This case may arise, for example, in instances where the Bluetooth® Host A 402 may go to sleep but some Bluetooth® functionality may still be required by the Bluetooth® host B 404. In step 420, the Bluetooth® host A 402 may send a command such as an HCI switch Vendor-Specific Command (VSC) to the Bluetooth® host controller 414. The Bluetooth® host controller 414 may then acknowledge receipt of the HCI switch VSC in step 220 by sending an HCI switch Acknowledge (ACK) VSC to the Bluetooth® host A 402 in step 422. After sending the HCI Switch ACK VSC in step 422, the Bluetooth® controller 414 may disable in event 442 the HCI transport 1 310 as shown in FIG. 3, to terminate any communications with the Bluetooth® host A 402. After receiving the HCI switch ACK VSC in step 422, the Bluetooth® Host A 402 may switch data flow off and may put the transmitting pins connecting to HCI transport 1 310 to high impedance in event 450. Bluetooth® host A 404 may send an HCI handover request in step 424 to Bluetooth® host B 404. This may be achieved via the HCI traffic interface 308, shown in FIG. 3. The Bluetooth® host B 404 may switch data flow off and may put the transmitting pins connecting to the HCI transport 1 310 to high impedance in event 454. The Bluetooth® host B 404 may send an HCI handover ACK VSC in step 426, confirming that it may initiate communications with the Bluetooth® host controller 414. This may allow Bluetooth® host A 402 to stop driving the HCI transport 1 bus in event 452. The Bluetooth® host B 404 may switch data flow on and switch the transmitting pins connecting to the HCI transport 1 310 to low impedance in event 456. This may permit the Bluetooth® host controller 414 to detect that the HCI transport 1 bus is active again in event 446 and may permit to flush the receiver memory at the Bluetooth® host controller 414. This may allow the Bluetooth® host controller 414 to switch data flow on and switch the transmitting pins connecting to HCI transport 1 310 to low impedance in event 448. The Bluetooth® Host B 404 may then enable its side of the HCI transport 1 310, shown in FIG. 3, and send a Ready to talk VSC in step 428 to the Bluetooth® host controller 414. The Bluetooth® host controller 414 may respond with a Ready to talk ACK VSC in step 430. The HCI handover from Bluetooth® host A 402 to Bluetooth® host B 404 may be complete and normal HCI communications between the Bluetooth® host B 404 and Bluetooth® host controller 414 may commence in step 412, HCI traffic.

In accordance with an embodiment of the invention, a method and system for multiple HCI transport for Bluetooth® host controllers may include communicating between a plurality of Bluetooth® hosts and a single Bluetooth® host controller by using one or more Bluetooth® host controller interfaces, as shown in FIG. 1C and FIG. 3. In FIG. 2 and FIG. 4, it may be seen how control of the Bluetooth® host controller interfaces may be assigned to one or more of the Bluetooth® hosts. Control of the Bluetooth® host controller interfaces may be switched among different Bluetooth® hosts, as is shown in FIG. 2 and FIG. 4. Protocol commands, shown in FIG. 2 and FIG. 3 may be used to communicate between Bluetooth® hosts, for example 102 and 104 in FIG. 1A, to control switching. Communications between Bluetooth® hosts may, as illustrated in FIG. 1C and FIG. 3, occur over interfaces different from the Bluetooth® host controller interfaces. Switching may occur without resetting the Bluetooth® hosts 102 and 104 in FIGS. 1C and 302 and 304 in FIG. 3, and Bluetooth® host controller 114 and 314 in FIG. 1C and FIG. 3, respectively.

Another embodiment of the invention may provide a machine-readable storage, having stored thereon, a computer program having at least one code section executable by a machine, thereby causing the machine to perform the steps as described above for multiple HCI transport for Bluetooth® Host controllers.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a Bluetooth system, the method comprising:
   communicating between a plurality of Bluetooth hosts and a collocated single Bluetooth host controller via one or more Bluetooth host controller interfaces, wherein the Bluetooth host controller comprises a Bluetooth radio that is shared by the plurality of Bluetooth hosts to transmit and receive Bluetooth communications, wherein control of the one or more Bluetooth host controller interfaces is assigned to a first Bluetooth host of the plurality of Bluetooth hosts;
   communicating protocol commands between the plurality of Bluetooth hosts via one or more additional interfaces that are distinct from the one or more Bluetooth host controller interfaces; and
   switching control of the one or more Bluetooth host controller interfaces from the first Bluetooth host to a second Bluetooth host of the plurality of Bluetooth hosts using the protocol commands communicated between the first and second Bluetooth hosts over the one or more additional interfaces.

2. The method according to claim 1, comprising assigning control of said one or more Bluetooth host controller interfaces to the first Bluetooth host of the plurality of Bluetooth hosts.

3. The method according to claim 1, comprising switching control of said one or more Bluetooth host controller interfaces from the second Bluetooth host to a third Bluetooth host of the plurality of Bluetooth hosts.

4. The method according to claim 3, comprising controlling said switching via the protocol commands communicated between the second Bluetooth host and the third Bluetooth host over the one or more additional interfaces.

5. The method according to claim 1, wherein the one or more protocol commands comprise a handover request command and a handover acknowledgement command.

6. The method according to claim 1, wherein the one or more additional interfaces comprises a synchronization interface.

7. The method according to claim 1, wherein said switching occurs without resetting of said plurality of Bluetooth hosts and said Bluetooth host controller.

8. A device for processing signals, the device comprising:
   one or more Bluetooth host controller interfaces that enable intra-device communications between a plurality of Bluetooth hosts and a single Bluetooth host controller, the one or more Bluetooth host controller interfaces being controlled by one of the plurality of Bluetooth hosts;

one or more additional interfaces that enable transmission of protocol commands between the plurality of Bluetooth hosts, the one or more additional interfaces being distinct from the one or more Bluetooth host controller interfaces;

the Bluetooth host controller comprising a Bluetooth radio for wireless transmissions, the Bluetooth host controller configured to:
- receive a first wireless Bluetooth transmission comprising first data via the Bluetooth radio;
- provide a first intra-device communication comprising the first data directly to one of the plurality of Bluetooth hosts via the one or more Bluetooth host controller interfaces;
- receive a second intra-device communication comprising second data directly from another of the plurality of Bluetooth hosts via the one or more Bluetooth host controller interfaces; and
- transmit a second wireless Bluetooth transmission comprising the second data via the Bluetooth radio; and a first Bluetooth host of plurality of Bluetooth hosts being configured to:
- switch control of the one or more Bluetooth host controller interfaces from the first Bluetooth host to a second Bluetooth host of the plurality of Bluetooth hosts based at least in part on a protocol command transmitted by the first Bluetooth host to the second Bluetooth host over the one or more additional interfaces.

9. The device according to claim 8, wherein said plurality of Bluetooth hosts enable assigning of said one or more Bluetooth host controller interfaces to the first Bluetooth host.

10. The device according to claim 8, wherein said one or more of said plurality of Bluetooth hosts enable switching control of said one or more Bluetooth host controller interfaces from the second Bluetooth host to a third Bluetooth host of the plurality of Bluetooth hosts.

11. The device according to claim 10, wherein said one or more of said plurality of Bluetooth hosts enable controlling said switching via one or more protocol commands transmitted between the second Bluetooth host and the third Bluetooth host over the one or more additional interfaces.

12. The device according to claim 11, wherein the one or more protocol commands comprise a handover request command and a handover acknowledgment command.

13. The device according to claim 8, wherein the one or more additional interfaces comprise a synchronization interface.

14. The device according to claim 8, wherein said plurality of Bluetooth hosts enable said switching without resetting said Bluetooth host controller or any of said plurality of Bluetooth hosts.

15. A non-transitory machine-readable storage having stored thereon, a computer program having at least one code section for processing signals in a Bluetooth system, the at least one code section being executable by a machine for causing the machine to perform steps comprising:
- communicating between a plurality of Bluetooth hosts and a collocated single Bluetooth host controller using one or more Bluetooth host controller interfaces, the plurality of Bluetooth hosts and the single Bluetooth host controller being physically collocated within a device;
- communicating protocol commands between the plurality of Bluetooth hosts via one or more additional interfaces that are distinct from the one or more Bluetooth host controller interfaces; and
- switching control of the one or more Bluetooth host controller interfaces from a first Bluetooth host of the plurality of Bluetooth hosts to a second Bluetooth host of the plurality of Bluetooth hosts using a switch command transmitted by the first Bluetooth host to the second Bluetooth host over the one or more additional interfaces.

16. The machine-readable storage according to claim 15, wherein said at least one code section comprises code for assigning control of said one or more Bluetooth host controller interfaces to the first Bluetooth host of the plurality of Bluetooth hosts.

17. The machine-readable storage according to claim 15, wherein said at least one code section comprises code for switching control of said one or more Bluetooth host controller interfaces from the second Bluetooth host to a third Bluetooth host of the plurality of Bluetooth hosts.

18. The machine-readable storage according to claim 17, wherein said at least one code section comprises code for controlling said switching via one or more protocol commands communicated between the second Bluetooth host and the third Bluetooth host over the one or more additional interfaces.

19. The machine-readable storage according to claim 15, wherein the protocol commands comprise a handover request command and a handover acknowledgment command.

20. The machine-readable storage according to claim 15, wherein the one or more additional interfaces comprise a synchronization interface.

21. The machine-readable storage according to claim 15, wherein said switching occurs without resetting of said plurality of Bluetooth hosts and said Bluetooth host controller.

\* \* \* \* \*